United States Patent Office 2,952,532
Patented Sept. 13, 1960

2,952,532

BENEFICIATION OF FERRUGINOUS ORES

Robert P. Cox, Madison, Wis., assignor to American Alcolac Corporation, Baltimore, Md.

No Drawing. Filed Aug. 19, 1957, Ser. No. 679,085

19 Claims. (Cl. 75—1)

This invention relates to the beneficiation of oxidic ores and more particularly to the beneficiation of non-magnetic, ferruginous, oxidic ores.

In addition to the high grade magnetic ferruginous ores, ore deposits which are found, for example, in the Mesabi range and in Michigan are known to contain vast amounts of lower grade ores referred to as taconite. The essential minerals of taconite are quartz, silica as a group, magnetite, siderite and other carbonates, and hematite, in that general order of abundance. Taconites have been defined, for example, by the laws of Minnesota as "ferruginous chert or ferruginous slate in the form of compact, siliceous rock, in which the iron oxide is so finely disseminated that substantially all of the iron-bearing particles of merchantable grade are smaller than 20 mesh," and further as "ore-bearing rock which is not merchantable, as iron ore in its natural state, and which cannot be made merchantable by simple methods of beneficiation involving only crushing, screening, washing, jigging, drying or any combination thereof."

Those taconites which contain sufficient amounts of magnetite ($Fe_3O_4$) to demonstrate magnetic properties have been beneficiated magnetically to recover the magnetite content. The associated non-magnetic hematite ($Fe_2O_3$), however, has been discarded from these processes. Likewise, non-magnetic taconite ores in which the iron is present as hematite have generally been unavailable as a source of iron even though they may contain larger proportions of iron than the magnetic taconites.

With the ever-increasing industrial consumption of steel, it is apparent that the high grade ferruginous ore reserves will be inadequate to meet the demand for any extended period of time. Since it long has been recognized that the plentiful taconite deposits ultimately must constitute the principal source of supply for domestic ore requirements, there have been intensive efforts during recent years to formulate a commercial method by which non-magnetic iron-bearing minerals may be recovered from low grade ores.

Unlike the high grade ferruginous ores which are rich in iron and which demonstrate sufficient magnetic properties to permit magnetic separation, the low grade ferruginous ores such as taconite are essentially non-magnetic and are relatively poor in iron values. Efforts have been made to roast the non-magnetic hematite ($Fe_2O_3$) in a reducing atmosphere to convert the hematite to its recoverable magnetic counterpart ($Fe_3O_4$). This expedient requires large amounts of heat since the entire ore charge must be heated to an elevated temperature to reduce the minor proportion of hematite contained therein. The economic disadvantage of such processes is readily apparent.

Attempts to separate low grade taconites by out-floating the siliceous gangue portion likewise are hindered by the large amounts of undesirable gangue which must be floated in order to obtain relatively minor proportions of the desired hematite. Moreover, because of extremely fine grained structure of the iron in taconite, the essential liberation of the value component normally requires comminution to a mesh size below about 200. As a result, an extremely serious sliming problem has plagued all efforts to beneficiate taconite either by flotation or magnetic separation procedures. Because colloidal slimes present such large surface area per unit weight and because selective flotation of colloidal particles is not practical, it has heretofore been found necessary either to depress the interferring slimes in the pulp or to effect their substantially complete removal prior to the recovery of iron. Either desliming or depressing the slime obviously results both in a decrease of available iron product and in an increase in process costs.

It is a primary object of the present invention to provide a method for the benefication of ferruginous oxidic ores which will permit greater and more economical recovery of iron values.

Another object of the invention is a beneficiation process effective economically to recover iron values from non-magnetic ferruginous oxidic ores.

It is an additional object of the present invention to provide an ambient temperature treatment for non-magnetic ferruginous oxidic ores which will enable the iron values to be magnetically recovered therefrom.

It is a further object of the present invention to provide a pretreatment of non-magnetic ferruginous oxidic ores which will enable the iron values to be economically separated therefrom by flotation.

It is a still further object of the present invention to provide a method by which the iron values of non-magnetic ferruginous ores may be recovered without the necessity of first desliming the ore.

It is also an object of the present invention to provide a method by which the iron values may be recovered from both the non-magnetic ferruginous ore and the slimes associated therewith in a single operation.

One or more of the foregoing objects is achieved by the present invention.

The present invention comprises a process for the beneficiation of ferruginous oxidic ores which comprises comminuting the ore to substantially completely liberate the ferruginous oxide from the gangue, pretreating the comminuted ore with a chemical reducing agent to modify at least a portion of the surfaces of the ferruginous oxide particles and subjecting the comminuted surface modified ore to beneficiation. The pretreated ore in accordance with the invention may be subjected either to a flotation process or to magnetic separation.

The present invention provides means whereby non-magnetic ferruginous oxidic ores may be treated at ambient temperatures to render the ore susceptible to suitable beneficiation processes. Moreover, when the agents of the present invention are added to an ore slurry containing a concentration of colloidal slimes heretofore effective to prevent satisfactory beneficiation, the resultant slurry contains essentially oxidic mineral particles, coagulated oxidic mineral slime particles, and cleanly washed siliceous gangue material. Hence, it is not only unnecessary to deslime the ore prior to beneficiation, but is economically disadvantageous. The present invention appropriately may be practiced in conjunction with any of the magnetic or flotation type separation processes which satisfactorily have been employed to beneficiate magnetic iron oxide-containing ores.

More particularly described, the present invention comprises contacting comminuted non-magnetic ferruginous oxidic ores with chemical reducing agents believed to effect a change in the surface oxidation-reduction potential of the ore particles. While it is not desired to be bound by the theory here expressed, it is believed that treatment of the comminuted ore according to the process of the invention results either in actual chemical reduction of portions of the surface of the ferruginous particles or, alternatively, alters the oxidation-reduction potential of portions of the surface of the ferruginous particle. Iron of the ore treated in accordance with the invention is rendered responsive to magnetic separation or, alternatively, to levitation from siliceous gangue and collection in a froth flotation process.

In the practice of the present invention, the ore is comminuted to a mesh size requisite to substantially completely liberate the value component from the gangue. Normally, comminution to a mesh size of between about 45 and about 300 is sufficient to liberate the iron values in even the lowest grade hematite. The comminuted ore then is treated with small quantities of chemical reducing agents to effect the desired modification of at least portions of the surface of the non-magnetic hematite. The surface modifying reagents effective in the process of the present invention may be added to the ore in aqueous solution, or, in the event that the reagent is insoluble in water, the reagent may be dissolved in an appropriate hydrocarbon solvent and subsequently emulsified into an aqueous suspension. Particular contacting procedures are not critical to the process of the present invention so long as the ore is thoroughly contacted with the solution or suspension of treating agent.

The present invention is especially suited for the beneficiation of non-magnetic oxidic ferruginous ores which contain iron in the +3 valence state. The non-magnetic oxidic ferruginous ores to which this invention is directed include, for example, hematite, goethite and the like.

The present invention embraces both organic and inorganic chemical reducing agents generally. Appropriate agents for the practice of the present invention include reducing monosaccharides such as glucose, xylose, dextrose, fructose, and the like; reducing polysaccharides such as sucrose, maltose, lactose, cellobiose and gentiobiose; esters of reducing saccharides such as mono- or polyacetates, octoates, oleates, benzoates, stearates, palmitate and the like of mono- or polysaccharides; metal salts of hydrophobic or water immiscible acids which contain the metal present in a reduced state, such as stannous octoate, cobaltous naphthenate, ferrous oleate and plumbous stearate; or, metal salts of hydrophilic or water miscible acids wherein a metal is present in the reduced state, such as antimonous chloride, chromous acetate, chromous chloride, manganous chloride, stannous chloride, sodium borohydride, and the like.

The amount of chemical reagent employed in the practice of the present invention may vary depending upon the nature of the ore, the type of separation process employed, the conditioning time, and the like. The saccharide reducing agents of the invention are preferably employed in amounts ranging from about 0.05 pound per ton of ore to about 0.6 pound per ton of ore. The metal salts of hydrophobic or hydrophilic acids are preferably employed in amounts ranging from 1 pound per ton of crude ore to about 40 pounds per ton of crude ore or more.

It has been found that while all of the various types of reducing agents are effective to modify the surfaces of the ferruginous oxide particles, the sugar esters are most effective in the coagulation of slimes and, therefore, are the preferred modifying agents.

The time of contact of the reducing agent and the ore may be varied between wide limits depending on the particular reagent and its concentration. Excellent results have been achieved with contact times ranging between 5 minutes and 7 days.

While it is unnecessary to control the pH of the flotation process of this invention, it is preferred to employ small amounts of alkaline agents such as, for example, sodium carbonate, sodium bicarbonate, sodium hydroxide, tetramethyl ammonium hydroxide, ammonium hydroxide, or the like. The alkaline agents may be employed in varying amounts, but the pH of the treating solution preferably should not exceed about 10. It has been found that some systems having a pH above about 10 exhibit a reduction in selectivity, especially when some of the reducing sugars are employed as the surface modifying agent. A pH of above about 10 also is desirably avoided to mitigate corrosion problems in the flotation equipment. The flotation process is preferably conducted at a pH of between about 7 and about 10.

In order to more fully illustrate the process of the present invention, preferred embodiments of the process generally will be described in conjunction with both magnetic separation and flotation processes.

Essentially non-magnetic ore is comminuted to a mesh size normally employed in magnetic separation, preferably to −200 mesh. The comminuted ore is then contacted with an aqueous solution or dispersion of a reducing agent. Reducing agents, such as a reducing sugar appropriately may be employed in amounts approximately 0.5 pound per ton of ore, while reducing salts such as stannous chloride may be employed in amounts approximating 40 pounds per ton of ore. The surface modifying agent preferably is maintained in contact with the ore for a period of from about 1 to about 24 hours. An alkaline agent such as sodium carbonate, sodium bicarbonate, or the like, is added in amounts ranging from 0 to 10 pounds per ton or more and preferably in an amount approximating 3 pounds per ton. Following the chemical treatment of the present invention, the ore is subjected to either a wet magnetic separation or, alternatively, is dried and subjected to a dry magnetic separation.

When the ore is to be separated by flotation, comminuted ore of a particle size normally employed in wet beneficiation processes, generally −45 to −200 mesh size, is contacted with the reducing agents of the present invention for time periods preferably ranging from about 5 minutes to about 1 hour. An alkaline agent such as sodium carbonate, sodium bicarbonate, or the like, preferably is added in amounts of between 3 and 5 pounds per ton, although, as above indicated, the pH of the system preferably should not exceed about 10.

When esters of reducing sugars or metal salts of hydrophobic acids containing metal in the reduced state are employed as the surface modifying reagents in the process of the present invention, the treated ore may be subjected directly to a froth flotation process by adding known anionic frothing agents, viz., long chain fatty alcohol or alcohol ether sulfates such as sodium lauryl sulfate, sodium oleyl sulfate, sodium cetyl sulfate, sodium oleyl ether sulfate, sodium lauryl ether sulfate, and the like; amyl alcohol, cresol, terpineol, pine oil, cresylic acid, petroleum sulfonates, soaps, or the like. When reducing sugars or hydrophilic salts containing metal in a reduced state are employed as the surface modifying agents of the present invention, the treatment desirably is followed or is carried out in the presence of a hydrophobic agent which appropriately may be a water immiscible alcohol such as methyl isooctyl carbinol, stearyl alcohol, or the like.

In flotation processes, the saccharide reducing agents of the present invention preferably are employed in amounts ranging from 0.1 to about 0.6 pound per ton, while the metal hydrophobic and hydrophilic salts preferably are employed up to 20 pounds per ton or more.

While the practice of the present invention in conjunction with a flotation process may be effected utilizing one chemical treatment and one flotation separation, it has been found advantageous to employ several separation steps with chemical treatment between each separation. Thus, for example, instead of treating the ore with a total of 0.2 pound per ton of reducing agent in the initial chemical treatment, the ore may be treated with 0.1 pound per ton of reducing agent prior to a first flotation separation and an additional 0.1 pound per ton of reducing agent prior to a second flotation separation. A low concentration of reducing agent, for example, 0.1 pound per ton of sucrose monostearate, has been found to yield a particularly high iron content in the froth, though, of course, the total amount of iron separated is less than if a larger amount of reducing agent had been employed. By employing a sequential operation the iron content of the froth of each separation is high and the several flotations levitate a major amount of the iron present in the ore.

It will be understood that known agents such as collecting agents, emulsifying agents, depressing agents, dispersing agents, activating agents, deactivating agents, inhibtors, and organic and inorganic conditioning agents may be admixed with the reagents of the present invention. One of the additional advantages of the process of the invention lies in the fact that it is unnecessary to employ a collector, as such, in a flotation system. In some instances, however, it may be desirable to employ a collector to still further increase the over-all efficiency of the process.

The following examples are presented to illustrate specific embodiments of the present invention and are not intended as a restriction on the scope of the invention as broadly disclosed and claimed.

EXAMPLE I

Fifty grams of red hematite taconite containing essentially hematite and iron-stained quartz was comminuted to about −200 mesh. Microscopic examination indicated that the fineness necessary to liberate the iron oxides from the silica gangue resulted in a high percentage of iron oxide slimes having a particle size of about 0.2 to 2.0 microns. A solution containing 370 mls. of water and 0.05 pound per ton (based on the crude ore) of sucrose monostearate was added to the comminuted ore and the ore was allowed to condition for 5 minutes. The mixture was then introduced into a 50 g. capacity "Denver" cell and agitated for 1 minute. Three pounds per ton of sodium carbonate and 0.2 pound per ton of sodium lauryl ether sulfate, a frothing agent, were admixed with the ore solution, flotation was begun, and froth samples were collected at 8 minute intervals. Between the first and second fractions an additional 0.05 gram of sucrose stearate and 0.12 pound per ton of sodium lauryl ether sulfate were added. The results are tabulated in Table 1.

Table 1

| Fraction | Weight in Grams | Percent Iron in Product |
| --- | --- | --- |
| 1 | 12.03 | 55.7 |
| 2 | 6.03 | 46.2 |
| 3 | 3.69 | 36.7 |
| Tailings | 28.25 | 25.4 |
| Original ore | 50.00 | 36.0 |

Thus, an iron recovery of 60.2% was obtained and the percent iron in the product was 50%.

EXAMPLE II

The sucrose monostearate of Example I was replaced with the saccharide esters shown in Table 2 with the indicated results.

Table 2

| Ester | Percent Iron Recovery | Percent Iron in Product |
| --- | --- | --- |
| Sucrose monooctoate | 60.5 | 51.2 |
| Sucrose dioctoate | 69.9 | 50.0 |
| Sucrose monopalmitate | 75.7 | 59.7 |
| Sucrose mono (12 hydroxy) stearate | 70.9 | 60.3 |
| Sucrose distearate | 87.0 | 57.0 |
| Sucrose benzoate | 79.0 | 52.0 |
| Glucose mono (12 hydroxy) stearate | 89.7 | 62.1 |
| Glucose mono-oleate | 85.0 | 60.7 |
| Glucose monobenzoate | 71.6 | 58.6 |

EXAMPLE III

The sodium lauryl ether sulfate of Example I was replaced by the following frothing agents with the indicated results.

Table 3

| Reagent | Percent Iron Recovery | Percent Iron in Product |
| --- | --- | --- |
| Triethanolamine lauryl sulfate | 62.0 | 54.0 |
| Amyl alcohol | 67.0 | 43.2 |
| Cresol | 75.9 | 47.6 |
| Terpineol | 80.6 | 57.9 |
| Pine oil | 71.3 | 60.3 |
| Cresylic acid | 75.1 | 58.2 |

EXAMPLE IV

The sodium carbonate of Example I was replaced with equivalent amounts of the following additives with the indicated results.

Table 4

| Additive | Percent Iron Recovery | Percent Iron in Product |
| --- | --- | --- |
| NaOH | 72.0 | 60.2 |
| $NaHCO_3$ | 61.9 | 60.9 |
| $NH_4OH$ | 64.2 | 57.3 |
| $(CH_3)_4NOH$ | 67.3 | 59.7 |

EXAMPLE V

The process of Example I was repeated except that the sucrose stearate was dissolved in an equal amount of mineral oil and dispersed in 5 volumes of water with a homogenizer prior to its addition to the ore slurry and conditioning time was extended to 15 minutes. The percent iron yield was 70.2% and the percent iron in the product was 63%.

EXAMPLE VI

The sucrose monostearate of Example I was replaced with 0.4 pound per ton of sucrose distearate. Analysis of the floated product indicated that the colloidal iron oxide slime of the original ore slurry had been coagulated and out-floated.

EXAMPLE VII

The following reagents were dissolved at 10% concentrations in mineral oil and employed at 5 pounds per ton level to replace the sucrose stearate of Example I.

Table 5

| Reagent | Percent Iron Recovered | Percent Iron in Floated Product |
| --- | --- | --- |
| Stannous octoate | 60.2 | 49.2 |
| Colbaltous naphthenate | 72.0 | 55.0 |
| Ferrous oleate | 60.0 | 49.0 |
| Lead(ous) stearate | 59.5 | 40.5 |

EXAMPLE VIII

The sucrose stearate of Example I was replaced with 0.3 pound per ton of sucrose and, after conditioning for 15 minutes, 0.3 pound per ton of methyl isooctylcarbinol and 5 pounds per ton of sodium bicarbonate were added to the mixture. Two fractions collected at 8 minute intervals were analyzed as follows.

Table 6

| Fraction | Yield in Grams | Percent Iron in Product |
| --- | --- | --- |
| 1 | 20.1 | 63.0 |
| 2 | 2.1 | 57.5 |

EXAMPLE IX

The sucrose of Example VIII was replaced by an equivalent amount of the following saccharides which were employed in a 10% concentration in mineral oil.

Table 7

| Reagent | Percent Recovery of Iron | Percent Iron in Product |
| --- | --- | --- |
| Glucose | 73.0 | 61.1 |
| Fructose | 65.0 | 57.3 |
| Galactose | 59.5 | 50.4 |
| Mannose | 62.5 | 58.9 |
| Lactose | 60.0 | 55.7 |
| Maltose | 63.3 | 52.1 |

EXAMPLE X

Fifty grams of the ore described in Example I was treated with 1% stannous chloride containing 1% HCl. After conditioning for 15 minutes, 0.3 pound per ton of stearyl alcohol was added and the mixture was agitated for 5 minutes prior to addition to the frothing agent. The analytical results are tabulated in the following table.

Table 8

| Fraction | Grams | Percent Iron in Product |
| --- | --- | --- |
| 0–5 min | 21 | 62.0 |
| 5–10 min | 4 | 47.0 |
| 10–15 min | .1 | 46.0 |

EXAMPLE XI

A solution containing 0.25 pound per ton of sucrose stearate was added to the ore described in Example I. After conditioning time of 15 minutes, 3.5 pounds per ton of sodium carbonate and 0.4 pound per ton of sodium lauryl ether sulfate were added to the ore mixture. The froth samples, collected at 8 minute intervals, were analyzed as follows.

Table 9

| Fraction | Yield in Grams | Percent Iron in Product |
| --- | --- | --- |
| 1 | 24.12 | 63.0 |
| 2 | 4.1 | 42.1 |
| 3 | 0.9 | 39.6 |
| Original ore | 55.0 | 36.0 |

Thus, a total of 87.0% of the iron was recovered and the concentration of the beneficiated product was 59.1%. Microscopic examination of the ore at various times in the process showed that the silica present had traces of iron protruding from the surface but the surface itself was free from absorbed iron. This indicates that grinding was not sufficient to completely liberate the iron oxide from the silica but that, nevertheless, the flotation system was so effective that gangue material containing more than the critical amount of iron oxide was floated with the iron oxide crystals. The iron oxide colloidal slime had been coagulated and floated with the denser mineral particles.

EXAMPLE XII

The process of Example XI was applied to samples of specular hematite, magnetite and martite from the Lake Superior region. In all cases the concentration of iron and the percent recovery of iron exceeded 55% and 75%, respectively.

EXAMPLE XIII

The process of Example I was repeated employing saccharide esters identified in Table 10. The indicated results were obtained after 8 minutes of flotation.

Table 10

| Reagent | Weight Percent Iron Recovered | Percent Iron in Product |
| --- | --- | --- |
| Sucrose octoate | 70.3 | 61.1 |
| Glucose oleate | 68.8 | 63.0 |
| Mannose stearate | 75.1 | 60.9 |

EXAMPLE XIV

To demonstrate the applicability of the present invention to magnetic extraction practices, 50 grams of Lake Superior earthy hematite containing a total of 37% iron were comminuted to —200 mesh. A solution containing 370 ml. of water and 3.0 pounds per ton of $Na_2CO_3$ and 0.5 pound per ton of sucrose was added to the comminuted ore. The ore was allowed to condition for the indicated periods of time and then magnetically extracted with the results as shown in Table 11.

Table 11

| Conditioning Time | Percent Magnetically Extracted Product | Percent Iron in Product | Percent of Total Iron as Magnetite |
| --- | --- | --- | --- |
| 0 minutes (untreated ore) | 19.0 | 62.5 | 32.0 |
| 15 minutes | 31.5 | 63.0 | 53.5 |
| 1 hour | 36.0 | 63.5 | 62.0 |
| 24 hours | 37.5 | 62.5 | 63.5 |
| 7 days | 44.0 | 63.5 | 75.5 |

EXAMPLE XV

The sucrose of Example XIV was replaced with the indicated saccharides and saccharide esters and the separation was performed in a manner identical to that of Example XIV. Conditioning time was 1 hour for the sucrose esters and 24 hours for the remaining compounds.

Table 12

| Material: | Percent Magnetically Extractable Product |
| --- | --- |
| Sucrose monostearate | 47.0 |
| Sucrose distearate | 36.5 |
| Sucrose palmitate | 40.0 |
| Sucrose dioleate | 37.5 |
| Sucrose diacetate | 39.0 |
| Sucrose monooctoate | 36.0 |
| Glucose | 30.0 |
| Fructose | 32.5 |
| Lactose | 33.0 |
| Glucose stearate | 38.5 |
| Fructose oleate | 37.0 |
| Glucose diacetate | 34.5 |
| Glucose dioctoate | 34.0 |

EXAMPLE XVI

The process of Example XIV was repeated employing the indicated amounts of sodium carbonate with the results as shown in Table 13. All samples were conditioned for 24 hours.

Table 13

| $Na_2CO_3$ (Pounds/Ton): | Percent Magnetically Extractable Product |
| --- | --- |
| 0.0 | 25.5 |
| 1.0 | 32.5 |
| 2.0 | 37.0 |
| 3.0 | 37.5 |
| 4.0 | 35.0 |
| 10.0 | 34.0 |

EXAMPLE XVII

Fifty grams of the ore described in Example XIV were treated with 200 grams of water containing ½% each of HCl and $SnCl_2$. After conditioning for three hours, the ore was extracted magnetically and found to contain 47.2% magnetic ore, as contrasted with 19.0% prior to treatment.

EXAMPLE XVIII

Sodium borohydride was substituted for the SnCl$_2$ and HCl of Example XVII and the treated ore was found to contain 38.5% magnetically extractable ore after this treatment.

What is claimed is:

1. A process for beneficiating non-magnetic ferruginous oxidic ores which comprises comminuting the ore to substantially completely liberate the ferruginous oxide from the gangue, pretreating the comminuted ore by contacting the ore with a chemical reducing agent selected from the group consisting of reducing sugars, esters of reducing sugars and metal salts wherein the metal is present in the reduced state to modify chemically at least a portion of the surfaces of the ferruginous oxide particles, and subjecting the comminuted, surface modified ore to beneficiation.

2. A process according to claim 1 in which the pretreated ore is beneficiated by flotation.

3. A process according to claim 1 in which the pretreated ore is beneficiated by magnetic separation.

4. A process according to claim 1 in which the ferruginous ore is non-magnetic hematite.

5. A process according to claim 1 in which the ore is comminuted to a particle size of between about 45 and about 300 mesh.

6. A process for beneficiating non-magnetic ferruginous oxidic ores which comprises comminuting the ore to substantially completely liberate the ferruginous oxide from the gangue, pretreating the comminuted ore by contacting the ore with a reducing sugar to modify chemically at least a portion of the surfaces of the ferruginous oxide particles, and subjecting the comminuted, surface modified ore to beneficiation.

7. A process according to claim 6 in which the reducing sugar is employed in a concentration of between about .05 and about 0.6 pound per ton of ore.

8. A process according to claim 6 in which a water immiscible alcohol is incorporated in the pretreating system.

9. A process according to claim 6 in which the pretreated ore is beneficiated by flotation.

10. A process according to claim 6 in which the pretreated ore is beneficiated by magnetic separation.

11. A process occording to claim 6 in which the ferruginous ore is non-magnetic hematite.

12. A process for beneficiating non-magnetic ferruginous oxidic ores which comprises comminuting the ore to substantially completely liberate the ferruginous oxide from the gangue, pretreating the comminuted ore by contacting the ore with an ester of a reducing sugar to modify chemically at least a portion of the surfaces of the ferruginous oxide particles, and subjecting the comminuted, surface modified ore to beneficiation.

13. A process according to claim 12 in which the reducing sugar is employed in a concentration of between about .05 and about 0.6 pound per ton of ore.

14. A process according to claim 12 in which the pretreated ore is beneficiated by flotation.

15. A process according to claim 12 in which the pretreated ore is beneficiated by magnetic separation.

16. A process according to claim 12 in which the ferruginous ore is non-magnetic hematite.

17. A process for beneficiating non-magnetic ferruginous oxidic ores which comprises comminuting the ore to substantially completely liberate the ferruginous oxide from the gangue, pretreating the comminuted ore by contacting the ore with a metal salt having the metal present in the reduced state to modify chemically at least a portion of the surfaces of the ferruginous oxide particles, and subjecting the comminuted, surface modified ore to beneficiation.

18. A process for beneficiating non-magnetic ferruginous oxidic ores which comprises comminuting the ore to substantially completely liberate the ferruginous oxide from the gangue, pretreating the comminuted ore by contacting the ore with an ester of a reducing sugar to modify chemically at least a portion of the surfaces of the ferruginous oxide particles, and subjecting the pretreated ore to froth flotation, said flotation sytem containing a frothing agent, and sufficient alkaline reagent to adjust the pH to between about 7 and about 10.

19. A process for beneficiating non-magnetic ferruginous oxidic ores which comprises comminuting the ore to substantially completely liberate the ferruginous oxide from the gangue, pretreating the comminuted ore with an ester of a reducing sugar to modify at least a portion of the surfaces of the ferruginous oxide particles, and subjecting the pretreated ore to froth flotation, said flotation system containing a frothing agent, a collector, and sufficient alkaline reagent to adjust the pH to between about 7 and about 10.

References Cited in the file of this patent

UNITED STATES PATENTS

| 1,670,021 | Clark | May 15, 1928 |
| 1,690,225 | Hahn | Nov. 6, 1928 |
| 1,944,529 | Schafer et al. | Jan. 23, 1934 |
| 2,120,217 | Harris | June 7, 1938 |
| 2,648,431 | Kasevniak | Aug. 11, 1953 |
| 2,695,100 | Barr | Nov. 23, 1954 |
| 2,696,912 | Atwood et al. | Dec. 14, 1954 |

OTHER REFERENCES

Wertheim: Textbook of Organic Chemistry, 2nd edition, 1945, The Blakiston Company, Philadelphia, Pa., page 377 relied on.

Handbook of Mineral Dressing, Ore and Industrial Minerals, Taggart, published by John Wiley and Sons, 1945, pages 12–33 through 12–35.